2,721,161
ASCORBIC ACID PREPARATION

Michael R. Maiese, Brooklyn, N. Y., assignor to American Home Products Corporation, New York, N. Y., a corporation of Delaware No Drawing. Application October 23, 1951, Serial No. 252,810

11 Claims. (Cl. 167—81)

This invention relates to an ascorbic acid preparation comprising ascorbic acid and a non-toxic surface-active agent. More particularly it relates to an ascorbic acid preparation comprising ascorbic acid and a non-toxic organic polymeric non-ionic surface-active agent in an aqueous medium.

Modern high-molecular-weight surface-active agents have previously found application in therapy. The important applications have been, as far as I know, (a) in the solubilizing of fat-soluble materials in aqueous media to facilitate oral administration, (b) in combination with other agents to prolong the duration of therapeutic blood levels of parenterally administered drugs, and (c) to correct faulty fat metabolism.

I have made the discovery that the use of such an agent in conjunction with orally administered ascorbic acid has the surprising effect of increasing the blood serum level of ascorbic acid and hastening the attainment of such level, even in patients having an abnormal resistance to ascorbic acid therapy. I consider this result surprising because ascorbic acid is a highly water-soluble substance and insoluble in the ordinary non-polar organic solvents, whereas in the past the surface-active agents have been considered therapeutically useful only with water-insoluble materials.

Accordingly it is an object of my invention to provide an ascorbic acid preparation for oral administration which will produce a therapeutic blood serum level of ascorbic acid and which will hasten the attainment of such level.

It is another object of my invention to provide such a preparation in an aqueous medium free of hydrophobe constituents.

It is a further object of my invention to provide a preparation of this kind that is palatable and readily ingestible.

Other objects and advantages of my invention will be apparent to those skilled in the art from the following disclosure.

In many patients suffering from a disfunction in ascorbic acid metabolism, due for example to stress reactions, the average fasting level of ascorbic acid in the blood is only about half that of normal patients—for example only about 0.5 mg. per 100 ml. When a test dose of 1 g. ascorbic acid is administered intravenously, intramuscularly or orally, the level after 2 hours may not rise and may, in fact, be lower than the fasting level. Five hours after the administration of the dose, the ascorbic acid level will have reached the fasting level or slightly lower. If, however, after determination of the fasting level in such abnormal cases, 1 g. ascorbic acid is administered orally according to my invention, the ascorbic acid level in the blood rises rapidly and in favorable cases will reach 1.0–1.5 mg. or more per 100 ml. This level can be maintained indefinitely by repeated administration.

The preparations of my invention are free of hydrophobe substances, which I call hydrophobes, such as fatty oils and other lipoid-soluble substances. In treating scurvy the present tendency is to give large doses of ascorbic acid, and in acute scurvy massive doses of the order of 1 g. per day or more may be given. It is essential, therefore, that the physician have available an ascorbic acid preparation free of substances which may not be well tolerated in large amounts, such for example as vitamin A and D concentrates; both of the latter may produce undesirable effects with excess dosage. Accordingly, in the preferred embodiments of my invention ascorbic acid is the sole therapeutic agent in conjunction with the surface-active agent. Such preparations give the physician complete flexibility in prescribing ascorbic acid dosage without having to take into consideration the presence of other therapeutic agents which might be undesirable or non-functional. However, it is not my intention to exclude from my preparations subsidiary amounts of water-soluble constituents that do not limit the utility of my preparations and that, like ascorbic acid, may be administered in relatively large doses.

For example, preparations according to my invention may contain in addition to ascorbic acid: sodium para-aminobenzoate, sodium gentisate or sodium salicylate. If added to the formulation of my preferred embodiment described below, the amounts added per 100 ml. may, for example, be 10 g. sodium para-aminobenzoate, or 6 g. sodium gentisate, or 12 g. sodium salicylate. Each 5 ml. (one teaspoonful) would then contain 500 mg. sodium para-aminobenzoate, or 300 mg. sodium gentisate, or 600 mg. sodium salicylate respectively in addition to 625 mg. ascorbic acid.

A preferred surface-active agent for use in my preparation is polyoxyethylene sorbitan monooleate (e. g. "Tween 80" produced by the Atlas Powder Co.). This product is satisfactory because (a) of its proved non-toxicity, (b) of its favorable hydrophilic-lipophilic balance, and (c) it gives optically clear solutions to the naked eye. Other surface-active agents, however, may be substituted and the clarity of the solution is more of an esthetic than practical requirement provided there is no actual settling of sediment. Among other usable surface-active agents are:

Non-ionic—
  Polyoxyethylene sorbitan monolaurate ("Tween 20") (Atlas)
  Polyoxyethylene sorbitan trioleate ("Tween 85") (Atlas)
  Polyoxyethylene sorbitol pentaoleate ("G–1205") (Atlas)
  Tetraethyldesoxypolyethylene glycol ("T. D. 750") (Carbide & Carbon)
  Alkylarylpolyethoxy ethanol ("Triton X–100") (Röhm & Haas)

One preferred embodiment of my invention has the following composition:

| | |
|---|---|
| Ascorbic acid | g__ 12.5 |
| Polyoxyethylene sorbitan monooleate ("Tween 80") | g__ 30.0 |
| Glycerol | g__ 20.0 |
| Citric acid | g__ 0.8 |
| Sodium saccharin | g__ 0.3 |
| Sucrose | g__ 5.0 |
| Oil of orange (terepeneless) | ml__ 0.1 |
| Sodium benzoate | g__ 0.1 |
| Sodium propionate | g__ 0.1 |

NaOH to approximately pH 6.5.
Water to 100 ml.

This preparation is a clear, light amber, viscous liquid, of pleasant taste, and of good shelf life, which disperses rapidly in the saliva of the mouth. The essential ingredients are, of course, ascorbic acid, the surface-active agent "Tween 80" and water. The glycerol is added to prevent gelling and reduce viscosity; the citric acid, saccharin, sucrose and oil of orange are added for flavor; the sodium benzoate and propionate prevent fermentation and mold growth and the pH is adjusted to a value of maximum stability of ascorbic acid in an aqueous medium. While each ingredient in the above formulation has a definite function in providing a preparation of pleasant consistency and taste and of good shelf life, from the physiological point of view the glycerol, the flavoring materials, the benzoate and propionate and the pH adjustment may be omitted without seriously impairing the activity of the preparation.

The relative amounts of the ingredients may be varied considerably from the above listed optimum amounts. The "Tween 80" may vary from about 10 g. to about 40 g. per 100 ml. of preparation. The ascorbic acid may be reduced without limit, but 2 g. is as low as would be desirable for ordinary therapeutic use. It may be as high as 20 g. The ratio of 20 g. glycerol to 30 g. "Tween 80" gives minimum viscosity, but, as pointed out above, the glycerol may be omitted altogether; on the other hand it may be increased to 30 g. without seriously impairing the efficacy of the preparation. The flavoring materials may be varied to taste within wide limits, or omitted, or other flavors may be substituted. An antiferment and a fungicide are desirable for shelf life but not essential. The pH is preferably adjusted to about 6.5, at which point aqueous ascorbic acid is most stable, but may range from 6.0 to 7.0. Or, if the preparation is to be used at once, the adjustment may be omitted.

In making up my preparation I prefer to dissolve the ascorbic acid, citric acid, saccharin, sucrose and sodium benzoate and propionate in 36 ml. distilled water with the aid of heat under a blanket of nitrogen, and then add the glycerol. I then separately dissolve the oil of orange in the "Tween 80." The two solutions are then mixed, brought to pH 6.5 with a few ml. of 50 percent NaOH and finally diluted with water to 100 ml.

In cases where only small doses of ascorbic acid are required, e. g. 100–200 mg., my preparation may be given in capsule form, the capsule containing only ascorbic acid and surface-active agent. Such a capsule may, for example, contain 100 mg. ascorbic acid and 240 mg. polyoxyethylene sorbitan monooleate. The ratio of ascorbic acid to surface-active agent may be varied as disclosed above for the aqueous preparation.

In the case of a woman who had suffered from hirsutism and irregular menses for a long period, administration of a preparation according to my invention resulted in marked remission of facial hair and dramatic regulation of the menstrual cycle to 28 days.

The effect of my preparation on ascorbic acid-blood levels is shown in the following determinations on the serum of normal and arthritic individuals before treatment, after conventional treatment with ascorbic acid, and after treatment with my preparation.

The experiment was carried out on 7 men placed on a limited-ascorbic acid diet. A fasting ascorbic acid determination was made and 1 g. ascorbic acid in 100 ml. water administered orally. Three weeks later the experiment was repeated with the addition of polyoxyethylene sorbitan monooleate, glycerol, flavoring materials and preservatives to the dose. In each case blood samples were taken 2, 4½ and 24 hours after the start. Ascorbic acid determinations were made in the blood samples in duplicate. Average results are given in Table I. Subject 1 had a severe attack of influenza on the day of the second experiment; subject 5 had arthritis and subjects 6 and 7 were sub-clinical scorbutics.

TABLE I

*Ascorbic acid blood levels, mg. percent*

| Subject | Dosage with Aqueous Ascorbic Acid only | | | | Dosage with Aqueous Ascorbic Acid and Polyoxyethylene Sorbitan Monooleate | | | |
|---|---|---|---|---|---|---|---|---|
| | After 0 hrs. | After 2 hrs. | After 4½ hrs. | After 24 hrs. | After 0 hrs. | After 2 hrs. | After 4½ hrs. | After 24 hrs. |
| 1 | 2.2 | 4.1 | 3.1 | 2.1 | 1.37 | 4.06 | 2.6 | 2.23 |
| 2 | 1.63 | 3.9 | 2.8 | 1.62 | 1.47 | 3.83 | 2.91 | 2.91 |
| 3 | 1.42 | 3.5 | 2.1 | 1.52 | 1.39 | 3.33 | 3.15 | 1.78 |
| 4 | 1.32 | 1.8 | 2.0 | 1.66 | 1.28 | 2.9 | 3.79 | 1.6 |
| 5 | 0.25 | 1.2 | 0.66 | 0.35 | 0.23 | 1.49 | 1.26 | 0.70 |
| 6 | 0.36 | 1.4 | 1.3 | 1.06 | 0.24 | 1.92 | 1.7 | 1.29 |
| 7 | 1.32 | 2.1 | 2.2 | 0.95 | 1.21 | 2.88 | 2.36 | 1.40 |
| Average for subjects 1, 2, 3, 4, and 7 | 1.58 | 3.1 | 2.4 | 1.57 | 1.35 | 3.4 | 2.96 | 1.98 |
| Average for subjects 5 and 6 | 0.31 | 1.3 | 0.98 | 0.71 | 0.24 | 1.71 | 1.48 | 1.00 |

Subjects 1, 2, 3, 4 and 7 had a substantially normal ascorbic acid blood level, while subjects 5 and 6 had a markedly subnormal blood level. These groups have been averaged separately in the last two lines of Table I.

If these levels are converted to percentages of the fasting level and the increases over the fasting level (0 hour level) tabulated, the following comparison is obtained:

TABLE II

*Percentage increase in ascorbic acid blood levels over the fasting level after the indicated number of hours*

| | Dosage with Aqueous Ascorbic Acid Only | | | Dosage with Aqueous Ascorbic Acid and Polyoxyethylene Sorbitan Monooleate | | |
|---|---|---|---|---|---|---|
| | After 2 hrs. | After 4½ hrs. | After 24 hrs. | After 2 hrs. | After 4½ hrs. | After 24 hrs. |
| Average for subjects 1, 2, 3, 4 and 7 | 96 | 52 | −0.6 | 152 | 119 | 47 |
| Average for subjects 5 and 6 | 320 | 217 | 130 | 610 | 518 | 317 |

PERCENTAGE GAIN WITH POLYOXYETHYLENE SORBITAN MONOOLEATE OVER CONVENTIONAL DOSAGE

| | | | | | | |
|---|---|---|---|---|---|---|
| Average for subjects 1, 2, 3, 4 and 7 | | | | +56 | +67 | +48 |
| Average for subjects 5 and 6 | | | | +290 | +301 | +187 |

These results show that in the first group there was a gain with conventional therapy at 2 and 4½ hours above the normal ascorbic acid blood level but that at 24 hours the gain had disappeared. With dosage according to my invention, however, the rise in blood level was much greater at 2 and 4½ hours and was still evident at 24 hours.

The advantage of my invention is, however, much more marked with the second group having a sub-normal content of ascorbic acid in the blood. While this group responded to some extent to conventional therapy, the greatly improved rapidity and extent of response to dosage according to my invention was remarkable. At two hours the ascorbic acid content of the blood had increased seven-fold and at 24 hours it was still at a normal level, which was four times the fasting level.

Another case illustrating response to dosage according to my invention is that of a male child suffering from acute scurvy. After 4 days treatment with a conventional ascorbic acid preparation at the rate of approximately 300–400 mg. per day in divided doses, his ascorbic acid blood level was 0.18 mg. percent. After an additional period of 21 days on a dosage of 600–650 mg. per day, his ascorbic acid blood level had fallen to less than 0.03 mg. percent. Thirteen days later dosage was started with my preparation—ascorbic acid, polyoxyethylene sorbitan monooleate, glycerol, flavoring materials and water—at the rate of 625 mg. ascorbic acid per day. Following a week of this regime, his ascorbic acid blood level had risen to 2.12 mg. percent, and his general condition was dramatically improved.

From the above description it is evident that my preparation opens up new possibilities in ascorbic acid therapy and is especially valuable in cases resistant to conventional therapy.

While I have not established the mechanism of the surprisingly favorable effect of a surface-active agent on the assimilation of ascorbic acid, a highly water-soluble material, and do not wish to be bound by the following hypothesis, it is possible that the explanation is as follows: It may be that in the case of persons resistant to ascorbic acid therapy a fatty layer or deposit exists on the inner wall of the small intestine which interferes with absorption and ultization of ascorbic acid when present in a simple aqueous phase, but which becomes permeable in the presence of a surface-active agent.

To those skilled in the art it will be clear from this disclosure that various modifications may be made in my preparation without departing from the scope of my invention as defined in the appended claims.

Where ascorbic acid is mentioned in the specification and claims, it is intended to include the physiologically equivalent ascorbates. Such salts are particularly the water-soluble salts of ascorbic acid and non-toxic cations, e. g. ammonium, sodium, potassium, calcium and ferrous ascorbates.

I claim:

1. An ascorbic acid preparation for oral therapy consisting of a hydrophobe-free mixture comprising a vitamin and a non-toxic organic polymeric non-ionic surface-active agent, said vitamin consisting of ascorbic acid, the concentration of the ascorbic acid being not less than 2 g. per 100 ml. and the surface-active agent exceeding the ascorbic acid in amount.

2. A preparation as defined in claim 1 in which the surface-active agent is a polyoxyethylene sorbitan higher fatty acid ester.

3. A preparation as defined in claim 1 in which the surface-active agent is a polyoxyethylene sorbitan monooleate.

4. A preparation as defined in claim 1 in which the surface-active agent is polyoxyethylene sorbitan monolaurate.

5. An ascorbic acid preparation for oral therapy consisting of an aqueous hydrophobe-free solution containing not less than 2 g. per 100 ml. ascorbic acid as the sole therapeutic agent, and a polyoxyethylene sorbitan higher fatty acid ester in an amount greater than that of the ascorbic acid.

6. An ascorbic acid preparation for oral therapy as defined in claim 5, wherein the partial higher fatty acid ester is polyoxyethylene sorbitan monolaurate.

7. An ascorbic acid preparation for oral therapy as defined in claim 5 wherein the partial higher fatty acid ester is polyoxyethylene sorbitan monooleate.

8. A therapeutic preparation for oral administration which consists of a clear viscous aqueous solution free from hydrophobes, said solution having a pH falling within the range 6.0 to 7.0 and containing from 10 to 40 grams of polyoxyethylene sorbitan monooleate per 100 milliliters of solution, said solution also containing glycerol in an amount ranging from 1 to 30 grams for each 30 grams of said monooleate present therein and a vitamin as the sole therapeutically active ingredient thereof, said vitamin consisting of ascorbic acid in an amount ranging from 2 to 20 grams for each 30 grams of said polyoxyethylene sorbitan monooleate present therein.

9. A preparation for oral therapy in unit dosage form which contains a vitamin as the sole therapeutically-active ingredient, said vitamin consisting of ascorbic acid, said preparation being free from hydrophobes and comprising a digestible capsule containing at least 100 milligrams of ascorbic acid and a substantially greater amount of a partial higher fatty acid ester of polyoxyethylene sorbitan.

10. A preparation for oral therapy in unit dosage form which contains a vitamin as the sole therapeutically-active ingredient, said vitamin consisting of ascorbic acid, said preparation being free from hydrophobes and comprising a digestible capsule containing at least 100 milligrams of ascorbic acid and a substantially greater amount of polyoxyethylene sorbitan monolaurate.

11. A preparation for oral therapy in unit dosage form which contains a vitamin as the sole therapeutically-active ingredient, said vitamin consisting of ascorbic acid, said preparation being free from hydrophobes and comprising a digestible capsule containing at least 100 milligrams of ascorbic acid and a substantially greater amount of polyoxyethylene sorbitan monooleate.

References Cited in the file of this patent

UNITED STATES PATENTS

| Number | Name | Date |
| --- | --- | --- |
| 2,292,417 | Wetherbee | Aug. 11, 1942 |
| 2,407,624 | Bird | Sept. 17, 1946 |
| 2,417,299 | Freedman | Mar. 11, 1947 |
| 2,524,247 | Zentner | Oct. 3, 1950 |
| 2,541,285 | Rawlins | Feb. 13, 1951 |
| 2,583,576 | Kern | Jan. 29, 1952 |